Nov. 14, 1933.   D. C. PRINCE   1,935,413

WELDING

Filed Aug. 12, 1930

Inventor:
David C. Prince,
by Charles E. Tullar
His Attorney.

Patented Nov. 14, 1933

1,935,413

UNITED STATES PATENT OFFICE 1,935,413

WELDING

David C. Prince, Schenectady, N. Y., assignor to General Electric Company, a corporation of New York Application August 12, 1930. Serial No. 474,842

15 Claims. (Cl. 219—4)

My invention relates to welding and more particularly to an improved arrangement for controlling the flow of current to the welding electrodes of a welding machine.

When welding with high speed spot welding machines or line welding machines, where the circuit is periodically interrupted during the welding operation to produce a plurality of spaced or overlapped welds, it is necessary to provide means capable of interrupting the welding circuit a great many times per minute. The use of mechanical switches for accomplishing this result has proved unsatisfactory even at low speeds of operation, and not at all suitable for making and breaking the welding circuit several hundred times per minute.

An object of my invention is to provide an improved current controlling arrangement having a very high maximum speed limit for making and breaking the welding circuit in welding machines.

A further object of my invention is to provide a system in which the flow of current to the welding electrodes is controlled through the agency of an electric discharge device.

A further object of my invention is to provide a system in which the frequency of servicing and part replacement of the current controlling device is reduced to a minimum.

Further objects of my invention will become apparent from the following description when considered in connection with the accompanying drawing, and its scope will be pointed out in the appended claims.

Figure 1:
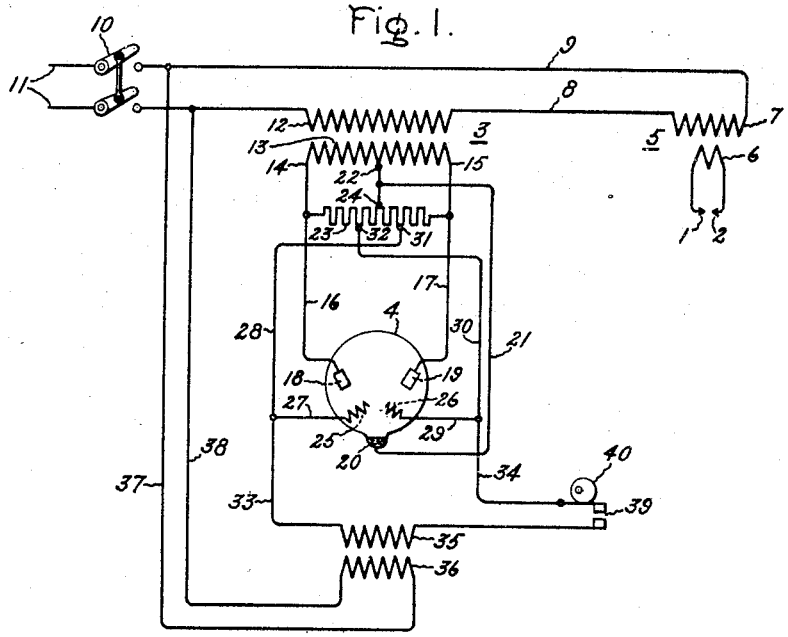
Figure 2:
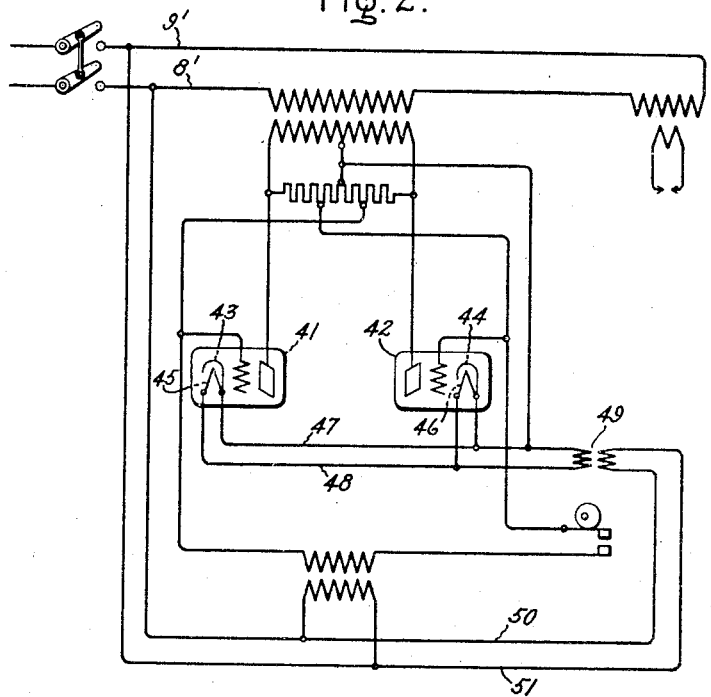

In the drawing Fig. 1 shows one embodiment of my invention in which the welding current is controlled through the agency of a mercury pool type discharge device, and Fig. 2 shows the same system suitably modified for control through the agency of hot cathode electric discharge devices.

In Fig. 1 of the drawing the welding electrodes are diagrammatically illustrated at 1, 2. The flow of welding current to these electrodes is controlled by varying the impedance of the welding circuit through the agency of an electric discharge device. In the arrangement illustrated the impedance of the welding circuit is controlled by means of a reactance placed in series with the primary of the welding transformer. As illustrated this reactance takes the form of series transformer 3 whose primary impedance is controlled by a grid controlled arc discharge device 4. The welding circuit includes a welding transformer 5 whose secondary 6 is connected to the electrodes 1, 2 and whose primary 7 is connected through conductors 8 and 9, the series transformer 3 and switch 10 to a source of supply 11.

The primary 12 of the series transformer 3 is connected in series with the primary 7 of the welding transformer 5, and the secondary 13 of the controlling transformer 3 is connected to the arc discharge device 4. The terminals 14 and 15 of the secondary 13 of this transformer are connected through conductors 16 and 17 to anodes 18 and 19 of the arc discharge device. The cathode 20 of the device, in the present instance, a pool of mercury, is connected through a conductor 21 to a midtap 22 on the secondary 13 of the transformer 3. A resistor 23 is connected across the secondary 13 of the transformer 3 and the conductor 21 is also connected to a mid-point thereof at 24. The control elements or grids 25 and 26 of the arc discharge device are connected through conductors 27, 28, 29, and 30 to taps 31 and 32 located on each side of the mid-tap 24 to which the cathode 20 of the arc discharge device is connected. These grids are also connected through conductors 33 and 34 to the secondary 35 of a grid controlling transformer, the primary 36 of which is connected through conductors 37 and 38 to conductors 8 and 9 through which energy is supplied to the welding transformer 5. The connection of the grid controlling transformer to the grids is controlled by a switch 39 which may be periodically opened and closed by a cam 40 suitably rotated by means not illustrated in the drawing. Other means may be used for opening and closing switch 39. It may be opened manually. In order to simplify the drawing the starting and maintaining circuits for the discharge device 4 are not shown. Any suitable arrangement may be used.

The control of the arc discharge device 4 is effected by means of the grids 25, 26. When these grids are excited in opposite phase to their respective anodes the arc discharge device will pass no current. When the grids are excited in phase with their respective anodes the device will permit current to flow and will continue to pass current until the phase of the grids is reversed, and the anode voltage passes through zero. The grids have no power to stop the flow of current once started as long as the anode voltage continues positive. They can only prohibit its starting again after it has passed through zero. With the control contacts 39 open the arrangement and connections are such that both grids 25 and 26 are negative when their respective anodes 18 and 19 are positive, thus preventing the flow of anode current. When the control contacts 39 are closed, however, the arrangement is such that the grid polarity is reversed, the grids 25 and 26 now becoming positive when the respective anodes are positive and current is permitted to flow through the discharge device 4. If we assume then that grid phase is opposite to that of the anodes, no current will flow through the arc discharge device. No load is then imposed upon the series transformer and its primary winding will pass only a small exciting current and, consequently, will present a relatively high impedance to the flow of current in the welding transformer primary, thus effectively stopping the flow of current at the welding electrodes 1 and 2. When the grid phase is reversed the discharge device will pass a current and act substantially as a short-circuit for the secondary 15 of the controlling transformer 3. The primary 12 of this transformer will then present only a small leakage reactance to the flow of load current and approximately 95 per cent of the voltage of the supply source 11 will be available across the primary 7 of the welding transformer 5.

The reversal of grid phase may be accomplished by several methods. In the illustrated method a cam 40, which may be a part of the welding machine, opens and closes a small switch in accordance with the welding operation desired. The connections of the grid transformer and of the controlling transformer are such that the instantaneous polarity of terminal 15 of the controlling transformer 3 is the same as that of the right-hand terminal of the secondary 35 of the grid transformer. With the switch 39 open as illustrated in the drawing the operation of the system during that half cycle of current flow when the terminal 15 and the right-hand terminal of the secondary 35 of the grid transformer are positive, is as follows: By reason of their connections to the resistance 23 the grid 26 of the arc discharge device 4 will be negative with respect to the cathode 20 when anode 19 is positive. This condition results by reason of the fact that the fall of potential along the resistance 23 is from the right to the left, as viewed in the drawing, the right-hand terminal of the resistor being connected to the right-hand terminal of the secondary 13 of the transformer 3 which has been assumed as having a positive polarity. At the same time by reason of their connections to the resistance 23, the grid 25 of the arc discharge device is positive with respect to the cathode 20 when anode 18 is negative. As has been previously noted, current will not flow from the anode to the cathode when the grid is negative with respect to the cathode and the anode positive. Neither will current flow from the cathode to the anode. Consequently, by reason of the connections illustrated, when the polarities are as assumed, the discharge device will allow no current to flow through the secondary of the series transformer 3. Under these conditions no load will be imposed upon the series transformer 3. Its primary winding will pass only a small exciting current and, consequently, will present a high impedance to the flow of welding current. When, however, switch 39 is closed the polarity of grid 26 will be changed from minus to plus and, since at this time, the anode 19 and grid 26 are in phase and both positive with respect to the cathode, current will flow through the discharge device from anode 19 to cathode 20 through conductor 21, secondary 13 of the controlling transformer 3, and conductor 17 back to the anode 19. The secondary 13 of the series transformer will thus be short-circuited through the discharge device 4 and the primary 12 of the transformer will then present only a small leakage reactance to the flow of welding current.

During the next half cycle the polarities assumed above will be reversed and current will flow in the circuit including anode 18 and cathode 20 when both grid 25 and anode 18 are made positive with respect to the cathode 20 by closing switch 39. That is, during the next half cycle of operation, conditions in the left-hand side of the tube are the same as those described above for the right-hand side of the tube.

Thus, by opening and closing the switch 39, the secondary of the transformer 3 may be open-circuited and short-circuited to control the impedance of the welding circuit through which energy is supplied to the electrodes 1 and 2. By using a full wave discharge device current may pass in both directions through transformer winding 13. This prevents saturation in the transformer and the described arrangement is to be preferred to a half wave discharge device, although a system embodying a half wave device is satisfactory and in accordance with my invention.

Since switch 39 carries only a small current its wear is negligible. The speed at which the equipment can be made to operate is limited only by the system frequency. For a 60 cycle system the equipment can operate 3600 times per minute, provided the switch 39 is suitably constructed to accomplish this purpose.

As long as the grid voltage is more negative than a value called the critical value, no current will flow through the discharge device. Whenever the anode voltage is positive and the grid voltage becomes less negative than the critical value, current starts and continues for the remainder of the half cycle. The average current flow may thus be controlled by varying the phase of the grid voltage with respect to that of the anode. The simplest method of varying the phase of the grid voltage with respect to the anode voltage is through any well-known combination of resistance, inductance and capacitance one of which is varied to change the phase. Consequently in the arrangement illustrated in Fig. 1, instead of the switch 39 being operated by a cam 40, any suitable phase control such as indicated above may be substituted without departing from my invention.

In Fig. 2 a system similar to that shown in Fig. 1 is illustrated, but instead of the double anode full wave discharge device there illustrated, a plurality of single anode devices 41 and 42 have been employed. In these devices, in place of a mercury pool cathode, indirectly heated cathodes 43 and 44 are employed. These cathodes are heated through filaments 45 and 46 connected through conductors 47 and 48 to a heating transformer 49 and through conductors 50 and 51 to the supply conductors 8' and 9'. As the arrangement of parts in Fig. 2 is otherwise the same as illustrated in Fig. 1, the system there disclosed will not be further described. Its method of operation is the same as that described above in connection with Fig. 1.

Other arrangements than those above described may be employed for controlling the discharge device to vary the flow of welding current to the welding electrodes. The controlled impedance may assume many forms and may be located in either the primary or secondary circuits of the welding transformer. In some cases discharge devices may be inserted directly in the welding circuit in order to control its impedance and thereby control the flow of welding current to the electrodes. Various arrangements may be used for controlling the activity of the discharge device. Thus, while I have shown and described two particular embodiments of my invention, such variations and modifications are contemplated as fall within the true spirit and scope of my invention, as pointed out in the appended claims.

What I claim as new and desire to secure by Letters Patent of the United States, is:

1. The combination with welding electrodes and a circuit in which the same are arranged, means including an arc discharge device for controlling the average current flow to said electrodes.

2. A welding system comprising a plurality of electrodes, a welding circuit connected to said electrodes, an impedance in said circuit, and means including an arc discharge device for periodically varying the effective value of said impedance.

3. A welding system comprising a plurality of electrodes, a welding circuit connected to said electrodes, a reactance in said circuit, and means including an arc discharge device for periodically varying the effective value of said reactance.

4. A welding system comprising a plurality of electrodes, a welding circuit connected to said electrodes, a grid controlled arc discharge device for controlling the flow of current in said circuit, and means for periodically controlling the voltage of the grid of said device above and below its critical value to control the flow of current through said device.

5. A welding system comprising a plurality of electrodes, a welding circuit connected to said electrodes, a controlling transformer connected in said circuit in series with said electrodes, a grid controlled arc discharge device for short-circuiting the secondary of said controlling transformer, and means for controlling the voltage of the grid of said device above and below the critical value at which current flows through said device.

6. A welding system comprising a plurality of electrodes, a transformer having primary and secondary windings, means for connecting said electrodes to the secondary of said transformer, a source of supply, means including an arc discharge device for controlling the connection of the primary of said transformer to said source of supply, and means for periodically interrupting the flow of current through said discharge device to control the flow of current through said welding electrodes.

7. A welding system comprising a plurality of electrodes, a welding transformer having primary and secondary windings, means for connecting said electrodes to the secondary winding of said welding transformer, a series controlling transformer having primary and secondary windings, means for connecting the primary of said transformer in series with the primary of said welding transformer, and means including an arc discharge device for periodically short-circuiting the secondary of said series controlling transformer.

8. The welding system comprising a plurality of electrodes, a welding transformer having primary and secondary windings, means for connecting said electrodes to the secondary winding of said welding transformer, a series controlling transformer having primary and secondary windings, means for connecting the primary of said transformer in series with the primary of said welding transformer, means including a grid controlled arc discharge device for short-circuiting the secondary of said series controlling transformer, and means for controlling the voltage of the grid of said discharge device above and below the critical value at which current flows through said device.

9. A welding system comprising a plurality of electrodes, a welding transformer having primary and secondary windings, means for connecting said electrodes to the secondary winding of said welding transformer, a series controlling transformer having primary and secondary windings, means for connecting the primary of said transformer in series with the primary of said welding transformer, an arc discharge device having an anode, a grid and a cathode, means for connecting the anode and cathode of said device to the secondary winding of said series controlling transformer, a source of grid voltage, and means for varying said voltage above and below the critical value at which current flows through said device between said anode and cathode.

10. In a welding system, welding circuit conductors and means for controlling the current therein comprising an arc discharge device connected in the welding circuit.

11. In combination, a welding transformer provided with primary and secondary windings, welding apparatus connected to said secondary winding, an impedance in series relation with said welding apparatus and an arc discharge device of controllable impedance connected in shunt relation to said impedance.

12. A welding system comprising a plurality of electrodes, an arc discharge device having a control element, means including said device for controlling the supply of current to said electrodes, and means for controlling the excitation of said control element and the flow of current through said device and said electrodes.

13. In a welding system, welding circuit conductors, means for controlling the current in said conductors comprising an arc discharge device connected in the welding circuit, said device having a control element, and means for controlling the excitation of said control element.

14. A welding system comprising a plurality of electrodes, an arc discharge device having an anode, a cathode and a control element, means including said arc discharge device for controlling the supply of current to said electrodes, and means for controlling the phase relationship between the voltages applied to the control element and the anode of said device and thereby controlling the flow of current through said device and said electrodes.

15. A welding system comprising a plurality of electrodes, a welding circuit connecting said electrodes to a source of alternating current supply, an arc discharge device having an anode, a cathode and a control element, means for connecting said device in said welding circuit, and means for controlling the phase relationship between the voltages applied to the control element and the anode of said device.

DAVID C. PRINCE.